Patented Feb. 12, 1946

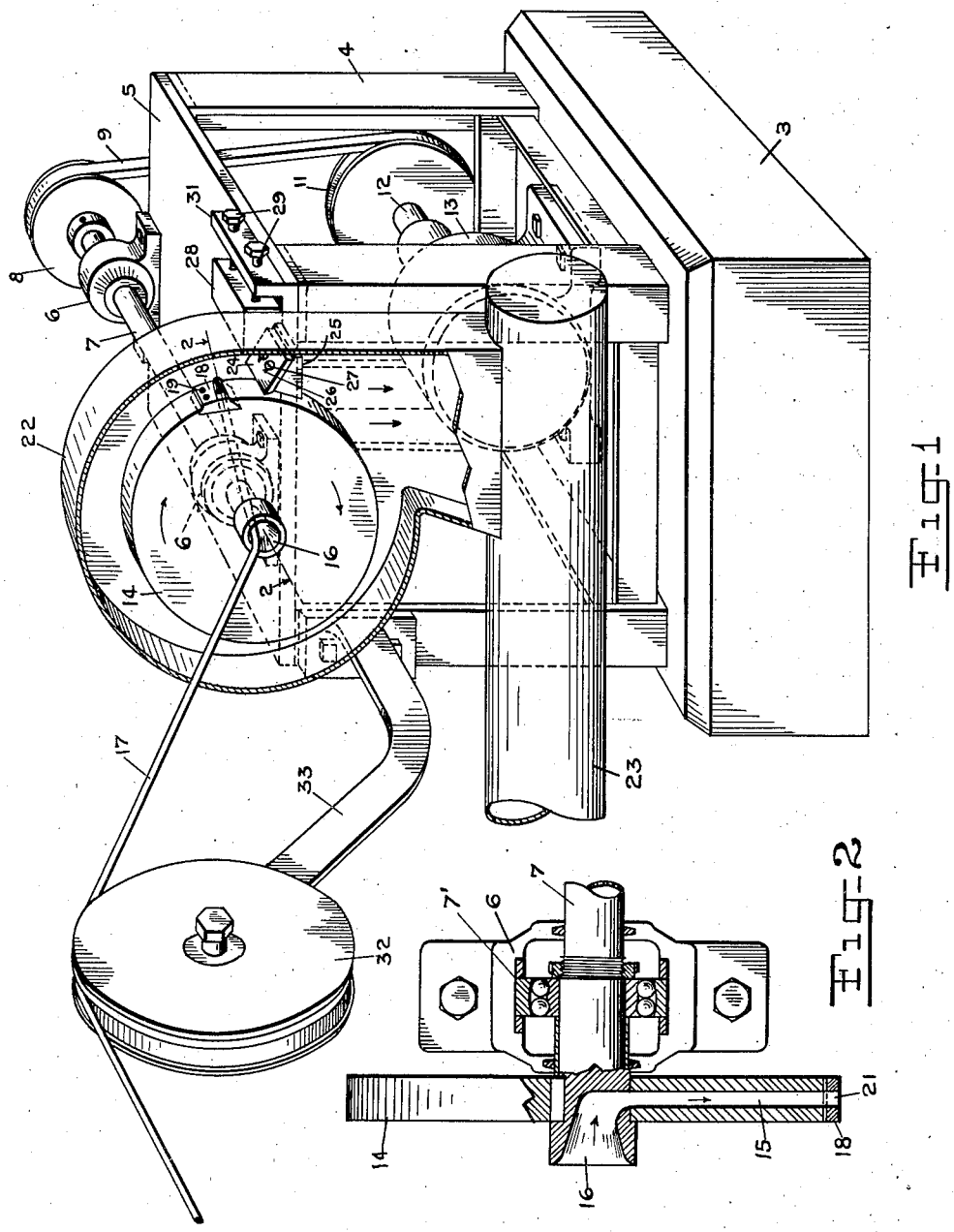

2,394,603

UNITED STATES PATENT OFFICE 2,394,603

APPARATUS FOR PRODUCING STAPLE FIBERS

Noel J. Folsom, Narrows, Va., and Silas M. Martin, Peterstown, W. Va., assignors to Celanese Corporation of America, a corporation of Delaware Application August 18, 1944, Serial No. 550,118

8 Claims. (Cl. 164—36)

This invention relates to the production of staple fibers, and relates more particularly to a novel apparatus for cutting continuous filamentary materials into staple fibers.

According to the present invention continuous lengths of filamentary materials are conveyed at a predetermined rate of feed to a cutting device which severs the filamentary materials into shorter or staple lengths.

In the accompanying drawing which illustrates a preferred embodiment of this invention:

Figure 1 is a perspective view of our novel cutting apparatus, partly cut away to show the cutting and discharging details, and Figure 2 is a detail view, partly in section, taken on line 2—2 in Figure 1, in the direction indicated by the arrows.

Like reference numerals indicate like parts throughout both views of the drawing.

Referring now to the drawing, wherein for illustrative purposes is shown the cutting of a continuous filament tow, the reference numeral 3 designates a base on which are mounted standards 4 for supporting a platform 5. Fixed in any suitable manner to the top of platform 5 are bearing blocks 6 in which is journaled a shaft 7, preferably in ball-bearing members 7'.

The shaft 7 carries at one end a grooved pulley 8 which is driven through belt 9 by a grooved pulley 11 mounted on a shaft 12 of motor 13 fixed to the top of base 3. At the other end of shaft 7 is carried for rotation a disc 14 having a radial channel 15 which is connected with a funnel-shaped axial channel 16 adapted to admit the tow 17 to the radial channel 15.

A portion of the periphery of disc 14 is cut away and a blade insert 18 is fixed therein as by screws 19, the blade insert being provided with an opening 21 in alignment with radial channel 15. The surface of blade insert 18 is curved for a purpose hereinafter set forth. The rotating disc 14 is contained in a housing 22 which leads into a conduit 23, connected to a suitable suction device, for conveying the fibers to any desired point for collection.

Blade insert 18 cooperates with a relatively fixed cutter blade 24 for severing the tow. The fixed blade is mounted on a sloping block 25 and is provided with slots 26 whereby the blade may be adjusted relative to the block 25 and the disc 14. The fixed blade is held in adjusted position by screws 27. The block 25 is contained within the housing 22 and may be connected to or integral with a block 28 adjustably carried on platform 5, the adjustment being effected by means of screw-bolts 29 fixed in block 28 and carried in a bracket 31 fixed to the platform 5. Movement of block 28 effects movement of sloping block 25 relative to said disc 25.

The tow to be cut may be prepared from filamentary materials taken from any convenient source and may be led directly into funnel-shaped axial channel 16. Preferably, however, means are provided for positively feeding the tow into the channel 16, said means comprising a channeled feed drum 32, around which the tow 17 is passed, positively driven by any suitable means (not shown). The drum 32 is rotatably carried on a bracket 33 fixed to one of the standards 4. The continuous feeding of the tow 17 through the radial channel 15 and the opening 21 in the disc 14 may be effected by the centrifugal force generated by the rotation of said disc.

The blade insert 18 is prepared with a curved portion of such radius that the fixed blade 24 is in contact with only one point on the blade insert during the cutting period instead of resting against the periphery of the disc 14 during the cutting cycle thus extending the life of the fixed blade 24, and makes for cutting accuracy. Both blade insert 18 and fixed blade 24 may be replaced when worn or dulled in use, the replacement of the blade insert making it possible to maintain a keen edge at the tow outlet point, thus still further improving the cutting accuracy and efficiency.

The tow to be cut into staple lengths may be crimped or uncrimped. The crimped tow may be prepared by feeding a bundle of filaments coming from the metiers directly into a crimping device and from the latter to the cutting apparatus.

It is to be understood that the foregoing detailed description is given merely by way of illustration and that many variations may be made therein without departing from the spirit of our invention.

Having described our invention, what we desire to secure by Letters Patent is:

1. Apparatus for producing staple fibers from continuous filamentary materials, comprising a rotatable member, a channel in said rotatable member having a portion thereof extending radially into the periphery of said rotatable member, a blade insert mounted in the periphery of said rotatable member, said blade insert having a curved surface an opening in alignment with said radial portion of said channel, and a fixed cutter cooperating with said blade insert to sever the filamentary materials.

2. Apparatus for producing staple fibers from continuous filamentary materials, comprising a rotatable member, a channel in said rotatable member having a portion thereof extending radially into the periphery of said rotatable member, a blade insert mounted in and extending beyond the periphery of said rotatable member, said blade insert having an opening in alignment with said radial portion of said channel, and a fixed cutter cooperating with said blade insert to sever the filamentary materials, the construction and arrangement being such that the fixed cutter is spaced from the periphery of said rotatable member and is in contact with said blade insert at one point only during the cutting period.

3. Apparatus for producing staple fibers from continuous filamentary materials comprising a rotatable member, a channel in said rotatable member having a portion thereof extending radially into the periphery of said rotatable member, a removable blade insert mounted in the periphery of said rotatable member, said blade insert having a curved surface an opening in alignment with said radial portion of said channel, and a fixed cutter cooperating with said blade insert to sever the filamentary materials.

4. Apparatus for producing staple fibers from continuous filamentary materials comprising a rotatable member, a channel in said rotatable member having a portion thereof extending radially into the periphery of said rotatable member, a removable blade insert mounted in the periphery of said rotatable member, said blade insert having a curved surface an opening in alignment with said radial portion of said channel, and an adjustable fixed cutter cooperating with said blade insert to sever the filamentary materials.

5. Apparatus for producing staple fibers from continuous filamentary materials, comprising a rotatable member, a channel in said rotatable member having a portion thereof extending radially into the periphery of said rotatable member, a removable blade insert mounted in the periphery of said rotatable member and having a portion thereof curved and extending beyond said periphery, said blade insert having an opening in alignment with said radial portion of said channel, and an adjustable fixed cutter cooperating with said blade insert to sever the filamentary materials.

6. Apparatus for producing staple fibers from continuous filamentary materials, comprising a rotatable member, a channel in said rotatable member having a portion thereof extending radially into the periphery of said rotatable member, a blade insert mounted in the periphery of said rotatable member, said blade insert having a curved surface an opening in alignment with said radial portion of said channel, an adjustable fixed cutter cooperating with said blade insert to sever the filamentary materials and means for feeding predetermined lengths of filamentary material to said channel.

7. Apparatus for producing staple fibers from continuous filamentary materials comprising a rotatable member, a channel in said rotatable member having a portion thereof, extending radially into the periphery of said rotatable member, a removable blade insert mounted in the periphery of said rotatable member, said blade insert having a curved surface an opening in alignment with said radial portion of said channel, an adjustable fixed cutter cooperating with said blade insert to sever the filamentary materials and means for positively feeding predetermined lengths of filamentary material to said channel.

8. Apparatus for producing staple fibers from continuous filamentary materials, comprising a rotatable disc, a channel in said rotatable disc having a portion thereof extending radially into the periphery of said rotatable disc, a removable blade insert mounted in the periphery of said rotatable disc, said blade insert having a curved portion extending beyond the peripheral surface of said disc and having an opening therein in alignment with said radial portion of said channel, a relatively fixed cutter cooperating with said blade insert to sever the filamentary material, the construction and arrangement being such that the fixed cutter is spaced from the periphery of said rotatable disc and is in contact with said blade insert at one point only during the cutting period, means for moving said fixed cutter relative to said rotatable disc and means for positively feeding predetermined lengths of filamentary material to the point of contact of said cutting members.

NOEL J. FOLSOM.
SILAS M. MARTIN.